(12) United States Patent
Joseph

(10) Patent No.: US 12,736,442 B2
(45) Date of Patent: Sep. 15, 2026

(54) BENCHMARK TEST POINT WITH INTEGRATED RFID TECHNOLOGY FOR A PARTICLE DETECTOR

(71) Applicant: ROCKWELL RESEARCH AND DEVELOPMENT GROUP, LLC, Portland, OR (US)

(72) Inventor: Steven William Joseph, Portland, OR (US)

(73) Assignee: ROCKWELL RESEARCH AND DEVELOPMENT GROUP, LLC, Portland, OR (US)

( * ) Notice: Subject to any disclaimer, the term of this patent is extended or adjusted under 35 U.S.C. 154(b) by 50 days.

(21) Appl. No.: 18/758,748

(22) Filed: Jun. 28, 2024

(65) Prior Publication Data

US 2025/0006039 A1 Jan. 2, 2025

Related U.S. Application Data

(60) Provisional application No. 63/510,742, filed on Jun. 28, 2023, provisional application No. 63/510,764, filed on Jun. 28, 2023, provisional application No. 63/511,662, filed on Jul. 2, 2023.

(51) Int. Cl.

| | |
|---|---|
| ***G01N 1/22*** | (2006.01) |
| ***G06K 7/10*** | (2006.01) |
| ***G06K 19/07*** | (2006.01) |
| ***G06K 19/077*** | (2006.01) |
| ***G08B 17/12*** | (2006.01) |
| ***G08B 27/00*** | (2006.01) |
| ***G08B 29/04*** | (2006.01) |

(52) U.S. Cl.
CPC ....... *G01N 1/2247* (2013.01); *G06K 7/10297* (2013.01); *G06K 19/0717* (2013.01); *G06K 19/07724* (2013.01); *G08B 17/12* (2013.01); *G08B 27/008* (2013.01); *G08B 29/043* (2013.01)

(58) Field of Classification Search
CPC .... G08B 29/043; G08B 17/01; G01N 1/2247; G06K 19/0717
See application file for complete search history.

(56) References Cited

U.S. PATENT DOCUMENTS

2003/0106593 A1* 6/2003 Taylor .................. F16K 15/026 137/614.2
2018/0284758 A1* 10/2018 Cella ....................... H02M 1/12
2019/0247690 A1* 8/2019 Trivelpiece ............ A62C 35/68
2023/0304982 A1* 9/2023 Eichenlaub ........ G01N 33/0062
2025/0305968 A1* 10/2025 Anderson .......... G01R 27/2623

* cited by examiner

*Primary Examiner* — Mirza F Alam
(74) *Attorney, Agent, or Firm* — White-Welker & Welker, LLC; Matthew T. Welker, Esq.

(57) ABSTRACT

An apparatus, system, and method for a benchmark test point with integrated RFID technology are described for use with a particle detector. The benchmark test point with integrated RFID technology comprises a body housing, an inlet valve, a compression device, an actuator sleeve, an outlet, an RFID chip and antenna, and an attachment method on the body housing for fastening the benchmark test point to a sampling pipe of a particle detector. The benchmark test point with integrated RFID technology is fail-safe in the normally closed position without the risk of being partially left open and can electronically record dynamic performance data at the source.

20 Claims, 5 Drawing Sheets

BENCHMARK TEST POINT WITH INTEGRATED RFID TECHNOLOGY FOR A PARTICLE DETECTOR

RELATED APPLICATION

The present application claims priority to U.S. Provisional Patent Application No. 63/510,742 filed on Jun. 28, 2023, U.S. Provisional Patent Application No. 63/510,764 filed on Jun. 28, 2023, and U.S. Provisional Patent Application No. 63/511,662 filed on Jul. 2, 2023, the entire contents of each are incorporated herein by reference.

TECHNICAL FIELD

The present disclosure is directed to a benchmark test point with integrated communication systems, such as Radio Frequency Identification (RFID) technologies, for a particle detector.

BACKGROUND

Particle detectors, such as aspirating smoke detectors, are engineered systems having a plurality of sampling points used to draw air from an ambient environment back to a particle detector through a sampling pipe or network of sampling pipes. Performance of such a system is contingent on the design and integrity of its sampling pipe network. Transport time of particles from the furthest point along a sampling pipe back to the particle detector is an indicative metric of performance verification. This point is often referred to as a benchmark test point, used to validate that an installation is in accordance with design parameters by comparing calculated transport time predictions against actual results when commissioning a system, and for establishing a benchmark for subsequent inspections.

In practice, particle detector technicians test particle transport times from a benchmark test point during commissioning of the particle detector and compare results of the test against design calculations to identify gaps in actual performance. If the results are within an acceptable range the technician records the results and that data is used as a benchmark for subsequent inspections. During subsequent inspections the test is repeated, and the results compared with recorded commissioning benchmark data to verify pipe integrity and system performance. Results of subsequent inspections are recorded for reporting and analysis purposes. Benchmark test points currently on the market have various challenges and limitations such as not being fail-safe in the normally closed position without the risk of being partially left open, need for external components to open, or lacking the ability to electronically record dynamic performance data at the source, requiring technicians to write down collected data that remains static.

Embodiments were conceived in light of the above-mentioned needs, problems and/or limitations, among other things.

SUMMARY

According to one or more embodiments, an apparatus is provided. The benchmark test point apparatus for use in conjunction with a particle detector comprises: a body housing; an inlet valve that removably connects to the body housing, wherein the inlet valve includes a plurality of O-rings, wherein said plurality of O-rings are constructed from one or more scaling materials, and said inlet valve has an orifice at one end that has an opening with one or more orifices centered between the O-rings; a compression device configured to hold the inlet valve in a closed position; an actuator sleeve, removably connected to the inlet valve, wherein the actuator sleeve is a mechanism to allow a user to control an open or closed position of the inlet valve; an outlet that includes an interchangeable insert that can be removably fixed into an insert to a channel in the body housing; an RFID chip and antenna that is removably connected to a part of the body housing; and an attachment method on the body housing for fastening the benchmark test point apparatus to a sampling pipe of a particle detector. In a particular case, the inlet valve serves as a passageway for air to enter and flow through the body housing when the inlet valve is in the open position, and the inlet valve restricts air from passing through the orifices of the inlet valve and into the body housing when the inlet valve is in the closed position. In another case, the materials used to construct the compression device can withstand pressure to at least 160 psi without leaking or fracturing and the compression device holding the inlet valve in a closed position is sized such that it provides sufficient compression to keep the inlet valve closed to at least 160 psi. In yet another case, the actuator sleeve includes a recess for mounting an NFC or other RFID chip and antenna that may be attached to the actuator sleeve. In yet another case, the outlet has an interchangeable engineered preformed through-hole sized equivalent to what is specified in calculations used to validate performance of the particle detector and its sampling pipe network. In yet another case, a vertical guide track in the body housing keeps the actuator sleeve from rotating until it reaches the valve fully open position where it can then be rotated to the locked position by way of optional locking tabs in the actuator sleeve that travel along a channel in the body housing. In yet another case, the RFID chip can permanently store and append commissioning, test, and inspection data for predictive analytics with retrieval and reporting functions to alleviate users from sourcing historical or missing static documentation. In yet another case, a custom application can be used on a computing device to read and append data stored on the RFID chip associated with the benchmark test point.

According to one or more embodiments, a system is provided. The benchmark test point system for use in conjunction with a particle detector comprises: a body housing; an inlet valve that removably connects to the body housing, wherein the inlet valve includes a plurality of O-rings, wherein said plurality of O-rings are constructed from one or more sealing materials, and said inlet valve has an orifice at one end that has an opening with one or more orifices centered between the O-rings; a compression device configured to hold the inlet valve in a closed position; an actuator sleeve, removably connected to the inlet valve, wherein the actuator sleeve is a mechanism to allow a user to control an open or closed position of the inlet valve; an outlet that includes an interchangeable insert that can be removably fixed into the insert to a channel in the body housing; an RFID chip and antenna that is removably connected to a part of the body housing; and an attachment method on the body housing for fastening the benchmark test point system to a sampling pipe of a particle detector. In a particular case, the inlet valve serves as a passageway for air to enter and flow through the body housing when the inlet valve is in the open position, and the inlet valve restricts air from passing through the orifices of the inlet valve and into the body housing when the inlet valve is in the closed position. In another case, the materials used to construct the compression device can withstand pressure to at least 160 psi without leaking or fracturing and the compression device holding the inlet valve in a closed position is sized such that it provides sufficient compression to keep the inlet valve closed to at least 160 psi. In yet another case, the actuator sleeve includes a recess for mounting an NFC or other RFID chip that may be attached to the actuator sleeve. In yet another case, the outlet has an interchangeable engineered preformed through-hole sized equivalent to what is specified in calculations used to validate performance of the particle detector and its sampling pipe network. In yet another case, a vertical guide track in the body housing keeps the actuator sleeve from rotating until it reaches the valve fully open position where it can then be rotated to the locked position by way of optional locking tabs in the actuator sleeve that travel along a channel in the body housing. In yet another case, the RFID chip can permanently store and append commissioning, test, and inspection data for predictive analytics with retrieval and reporting functions to alleviate users from sourcing historical or missing documentation. In yet another case, a custom application can be used on a computing device to read and append data stored on the RFID chip associated with the benchmark test point.

According to one or more embodiments, a method is provided. The method for transferring particles with a benchmark test point comprises: collecting an air sample through an inlet valve that serves as a passageway for air to enter and flow through a body housing when the inlet valve is in the open position, and the inlet valve restricts air from passing through the orifices of the inlet valve and into the body housing when the inlet valve is in the closed position; collecting performance data from the air sample using an RFID chip and antenna; storing and appending performance data from the RFID chip and antenna to an on-board read/write memory where an identifier in the form of text is written to define if the chip is a benchmark test point or a sample point, type of sample point, and orifice size; transmitting the data to a custom application used on a computing device to read chip data embedded in the benchmark test point; assigning the chip data from the custom application to a physical location and a specific particle detector, recording performance characteristics associated with the benchmark test point, and performing subsequent inspections to monitor the status of the particle detector. In a particular case, the chip data is stored in the cloud and can be retrieved by the custom application used on a computing device. In another case, a user can use a computing device to retrieve the data by either physically scanning the chip to pull up the data or selecting the chip data if already stored by the custom application used on a computing device. In yet another case, only authorized users having edit permissions can edit the chip data stored in the database and data written to memory can be permanently locked or password protected in which case the data is read only.

BRIEF DESCRIPTION OF DRAWINGS

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which.

DETAILED DESCRIPTION

Figure 1A:
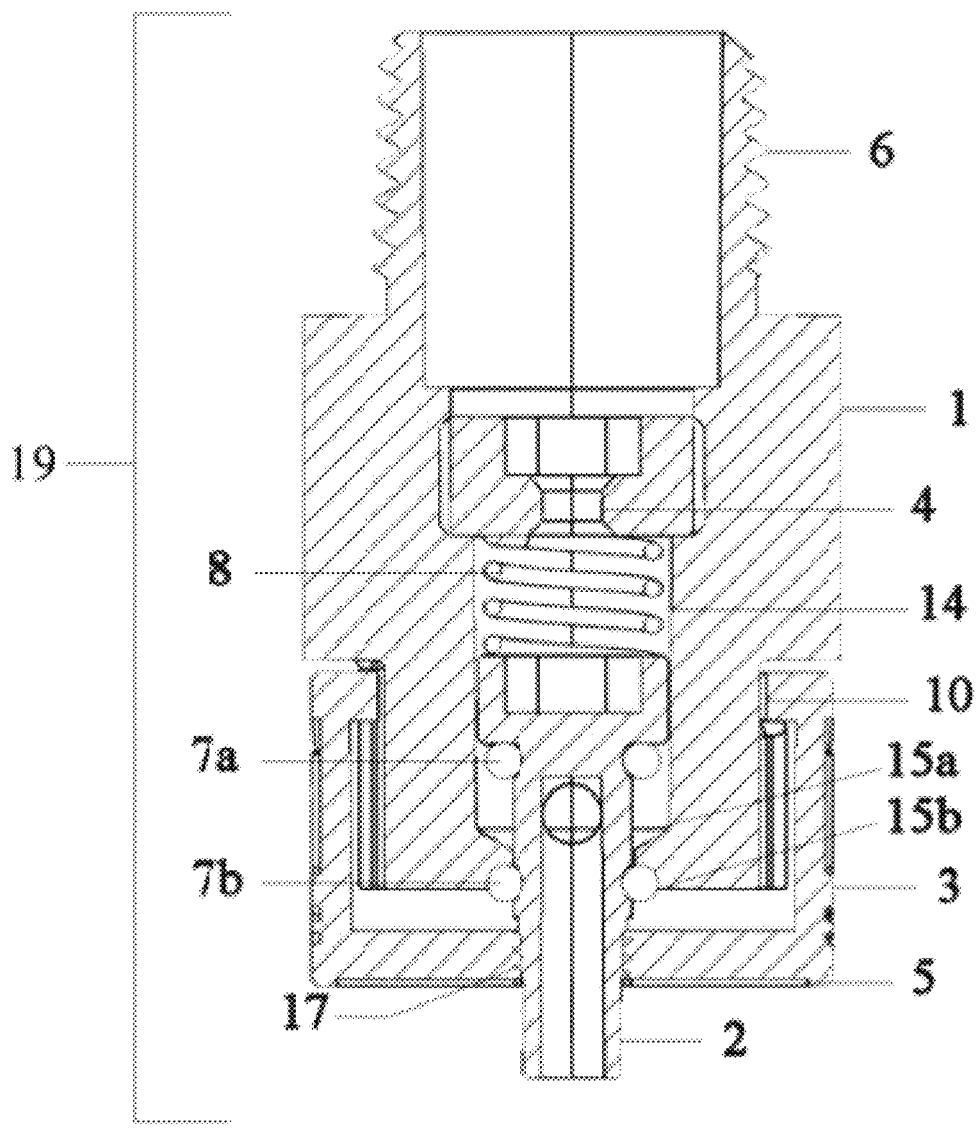
FIG. 1A is a cross-section view of a benchmark test point with integrated RFID technology for a particle detector.
Figure 1B:
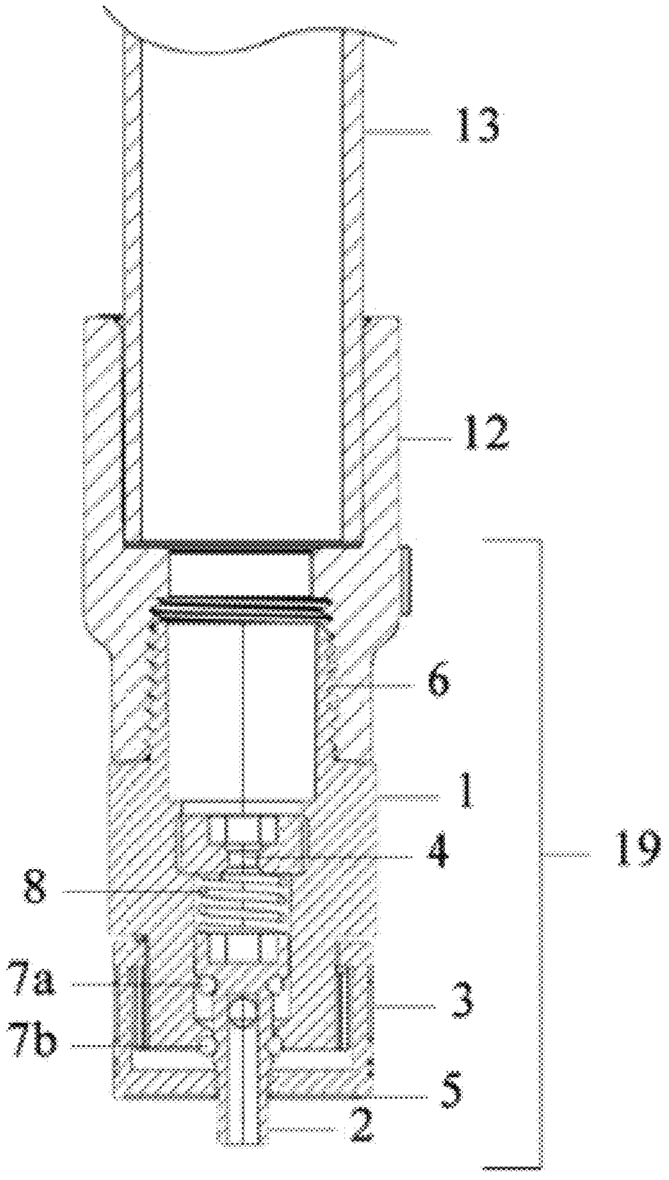
FIG. 1B is a cross-section view of a benchmark test point with integrated RFID technology for a particle detector with a sampling pipe.
Figure 2A:
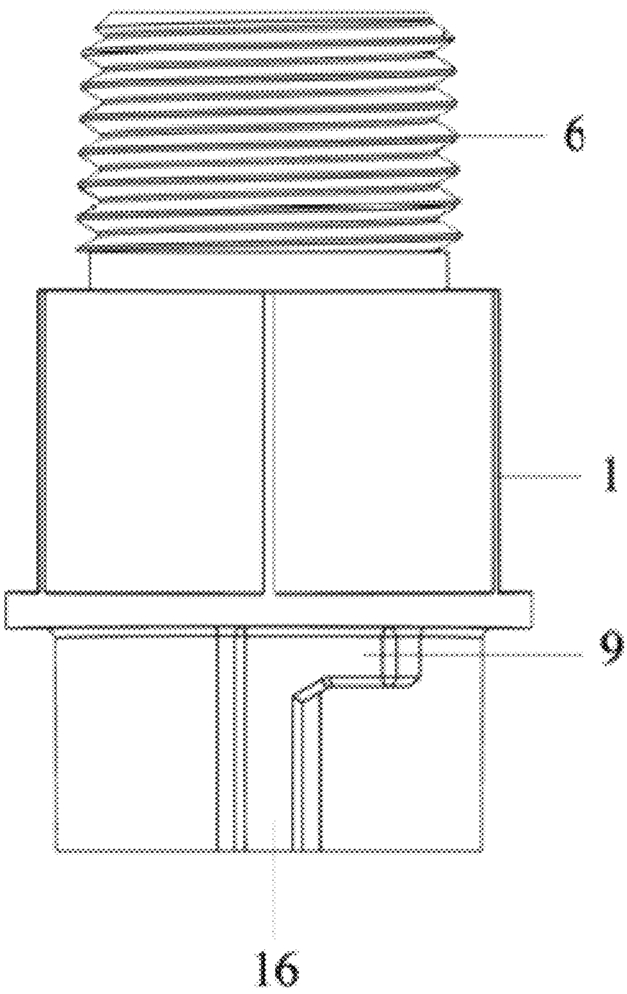
FIG. 2A is a side view of a benchmark test point with integrated RFID technology for a particle detector.
Figure 2B:
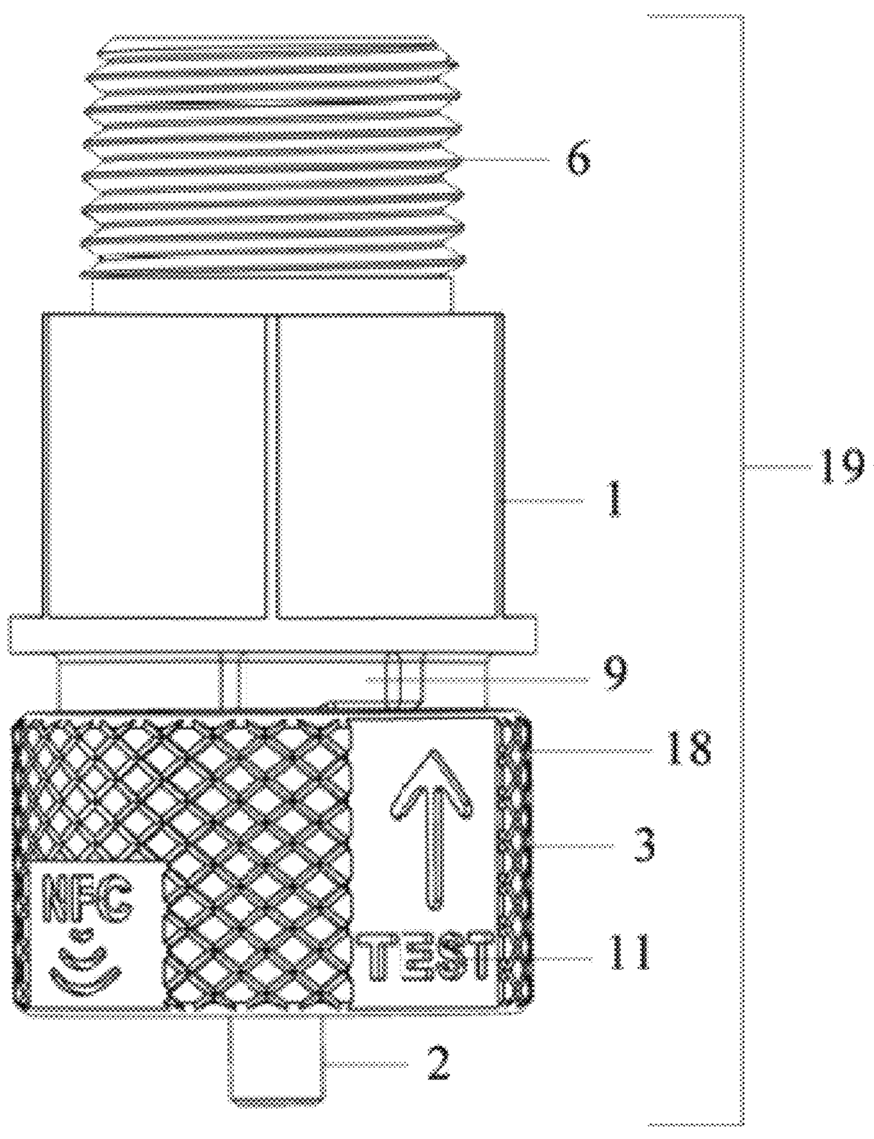
FIG. 2B is a side view of a benchmark test point with integrated RFID technology for a particle detector with an actuator sleeve.
Figure 3:
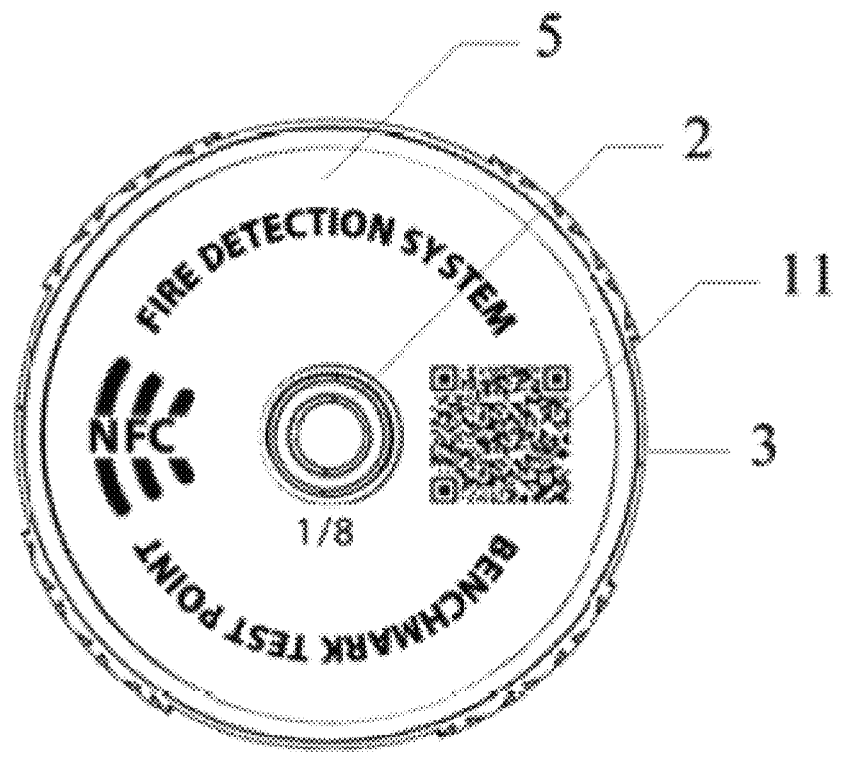
FIG. 3 is a top view of an actuator sleeve.

The following figures are interrelated and viewing the figures together while reading the detailed description will be of the most benefit. FIG. 1A is a cross-section view of a benchmark test point with integrated RFID technology for a particle detector. FIG. 1B is a cross-section view of a benchmark test point with integrated RFID technology for a particle detector with a sampling pipe. FIG. 2A is a side view of a benchmark test point with integrated RFID technology for a particle detector. FIG. 2B is a side view of a benchmark test point with integrated RFID technology for a particle detector with an actuator sleeve. FIG. 3 is a top view of an actuator sleeve.

The benchmark test point includes a body housing 1; an inlet valve 2; an actuator sleeve 3; an outlet 4 with an interchangeable engineered preformed appropriately sized chamfered through-hole; an RFID chip and antenna 5; an attachment method 6 for coupling body housing 1 to a coupling adapter 12 used to interface a benchmark test point assembly 19 to a sampling pipe 13 of a particle detector; an inlet valve upper seal 7*a* and an inlet valve lower seal 7*b* on inlet valve 2; a compression device 8 to interact with inlet valve 2 forcing it to remain in a closed position when not actuated; optional locking tabs 10 on actuator sleeve 3; a channel 14 for transporting air samples from an inlet valve 2 to an outlet 4; close position sealing surface 15*a* and open position sealing surface 15*b*.

In one or more embodiments, body housing 1 is made of chlorinated polyvinyl chloride (CPVC), stainless steel or any other suitable materials. The inlet valve 2 includes: an inlet valve upper seal 7*a*, and an inlet valve lower seal 7*b*; an orifice to transport sampled air through inlet valve 2; a fastening method 17 for securing the inlet valve 2 to an actuator sleeve 3. Inlet valve 2 includes a plurality of O-rings, wherein said plurality of O-rings are constructed from one or more sealing materials. In one or more embodiments, inlet valve 2 is made of CPVC, stainless steel or any other suitable materials. Inlet valve 2 removably connects to body housing 1 and has an orifice at one end that has an opening with one or more orifices centered between the O-rings which serve as a passageway for air to enter and flow through body housing 1 when inlet valve 2 is in the open position. When inlet valve 2 is in the closed position, the orifice in inlet valve 2 is not open all the way and the upper O-ring engages with the floor of body housing 1 restricting air from passing through the orifices of inlet valve 2 and into body housing 1. In one or more embodiments, a section of inlet valve 2 extends outside the actuator sleeve 3 region and serves as a connection point for appropriately sized tubing to optionally connect with a pressure reading apparatus should a user decide to take a suction reading from the benchmark test point when inlet valve 2 is in its opened position.

The actuator sleeve 3 includes: a fastening method 17 for securing the actuator sleeve 3 to an inlet valve 2; optional locking tabs 10 that interface with vertical guide track 16 and horizontal lock track 9 of body housing 1 for optionally locking inlet valve 2 in its opened position when testing; textured outer surface 18 to aid a user with grip when actuating; an area 11 for text, graphics and other identifiable text. For example, the text could indicate the direction for testing or that the test point is NFC equipped. In one or more embodiments, actuator sleeve 3 is made of CPVC, stainless steel or any other suitable materials. Actuator sleeve 3, removably connected to inlet valve 2, is a mechanism a user can engage with to control the open or closed position of inlet valve 2. In one or more embodiments, fastening method 17 can be a male thread on inlet valve 2 that removably connects to a mating female thread on actuator sleeve 3. In some embodiments, without optional locking tabs 10, actuator sleeve 3 with attached inlet valve 2 cannot be positioned in a locked position and a user would have to manually push up actuator sleeve 3 so that inlet valve 2 opens. If a user releases actuator sleeve 3, actuator sleeve 3 is pushed down by way of compression device 8 to a closed position thus closing inlet valve 2. Textured outer surface 18 is on the exterior of actuator sleeve 3 and is intended to aid in gripping actuator sleeve 3. In one or more embodiments, textured outer surface 18 can be any additive material, such as a rubber sleeve, or it can be a textured pattern etched, machined or molded into the part. In some embodiments, actuator sleeve 3 also includes a recess for mounting an NFC or other RFID chip that may be removably connected to actuator sleeve 3. When inlet valve 2 is in the open position, the lower O-ring engages with the outer region of the body and ensures that air only passes through the inlet valve 2 orifice and not from openings around the perimeter of actuator sleeve 3. Once inside body housing 1, air continues its passage through an orifice in outlet 4 which is an insert in body housing 1. In one or more embodiments, the orifice in outlet 4 is an interchangeable engineered size so that it is in accordance with flow calculation programs used to calculate flow and balance of air passing through the benchmark test point when inlet valve 2 is in the open position.

The outlet 4 includes: an interchangeable insert having an engineered preformed through-hole sized equivalent to what is specified in calculations used to validate performance of the particle detector and its sampling pipe network; a means for fixing the insert to the channel 14 in body housing 1. In one or more embodiments, outlet 4 is made of CPVC, stainless steel or any other suitable materials. Outlet 4 is removable and can be replaced with an alternative outlet having a different orifice size in the event flow calculations require a different sized orifice as a result of modifications made to the particle detector pipe network. Outlet 4 is attached to body housing 1 by threads or any other suitable means. In some embodiments, outlet 4 can be exchanged with another insert having a different size engineered preformed through-hole. Chamfers along the through-hole mitigate whistling and formation of contaminants when inlet valve 2 is open.

The RFID chip and antenna 5 can be removably connected to any part of the benchmark test point, or to any related part of the benchmark test point, such as a coupling adapter 12 or sampling pipe 13 of a particle detector. RFID technology includes all types of RFID systems, such as Ultra High Frequency (UHF), High Frequency (HF), Near-Field Communication (NFC), Low Frequency (LF), etc., and RFID technology integration with a benchmark test point of a particle detector can be applied to benchmark test points of any type or configuration. In one or more embodiments, the benchmark test point is removably connected to coupling adapter 12 on one end and a sampling pipe 13 is attached to the opposite side of coupling adapter 12. Sampling pipe 13 is part of the pipe network of a particle detector.

In one or more embodiments, attachment method 6 involves male threads on body housing 1 and coupling adapter 12 has mating female threads on one end that the body housing 1 removably connects to. The opposite end of coupling adapter 12 has a slip fitting intended to affix onto a sampling pipe 13 of a particle detector. There are other methods of interfacing body housing 1 to the sampling pipe 13 without use of coupling adapter 12. In one or more embodiments, body housing 1 has a tapered section sized according to the inside diameter of the sampling pipe 13 where body housing 1 is slid into the sampling pipe 13 inside diameter and affixed in place so that a user has options for interfacing the benchmark test point with a pipe network.

In one or more embodiments, compression device 8 is made of stainless steel or any suitable material that possesses spring characteristics. Compression device 8 that holds inlet valve 2 in a closed position is sized such that it provides sufficient compression to keep inlet valve 2 closed to at least 160 psi. In one or more embodiments, the materials used to construct compression device 8 are sized and designed such that they can withstand pressure to at least 160 psi without leaking or fracturing. The purpose of compression device 8 is to push inlet valve 2 removably connected to actuator sleeve 3 to a closed position. Compression device 8 is located between inlet valve 2 and outlet 4. Because outlet 4 is in a fixed position relative to body housing 1, inlet valve 2 is forced to a closed position by compression device 8 when actuator sleeve 3 is not held in the opened position.

In one or more embodiments, optional locking tabs 10 on actuator sleeve 3 interface with a vertical guide track 16 on body housing 1 keeping actuator sleeve 3 from rotating. Sliding actuator sleeve 3 upward within guide track 16 guides optional locking tabs 10 to a horizontal lock track 9. In one or more embodiments, twisting actuator sleeve 3 horizontally in the direction of the horizontal lock track 9 causes optional locking tabs 10 to retain actuator sleeve 3 in the upward position keeping inlet valve 2 open without physically having to hold actuator sleeve 3 in its upward position while testing. This approach keeps inlet valve 2 from automatically returning to its closed position when releasing. In one or more embodiments, a technician must physically turn actuator sleeve 3 horizontally in the opposite direction until optional locking tabs 10 clear the horizontal lock track 9 and allow a compression device 8 to return inlet valve 2 to its closed position.

Close position sealing surface **15*a* is the inside floor of body housing 1 and open position sealing surface 15*b* is the outside of body housing 1. In one or more embodiments, inlet valve upper seal 7*a* is the upper O-ring and inlet valve lower seal 7*b* is the lower O-ring. Close position sealing surface 15*a* and open position sealing surface 15*b* interact with inlet valve upper seal 7*a* and inlet valve lower seal 7*b* on inlet valve 2**.

Vertical guide track 16 in body housing 1 keeps actuator sleeve 3 from rotating until it reaches the valve fully open position where it can then be rotated to the locked position by way of optional locking tabs 10 in the actuator sleeve 3 that travel along the vertical guide track 16.

Benchmark test points are installed at the furthest end of any pipe run. The particle detector works like a vacuum where a fan in a detector unit draws air though holes placed along a pipe network. When the test point is open, it draws air through the benchmark test point where the testing particulate, such as synthetic smoke, is introduced to test the response of the detector within a given timeframe. In some embodiments, passive RFID chips do not have their own power source and instead rely on an electromagnetic field generated by an RFID reader, such as an RFID capable mobile phone, to power their circuits momentarily when they are within proximity. This energy harvesting method allows passive RFID chips to transmit their stored data back to the reader.

When testing particle transport time, a technician can slide the actuator sleeve 3 upwards to its upper most vertical position causing an inlet valve upper seal 7*a* on the inlet valve 2 affixed to actuator sleeve 3 to disengage with the body housing 1 close position sealing surface 15*a* and an inlet valve lower seal 7*b* to engage with open position sealing surface 15*b*, effectively opening a pathway for particles to transport from the ambient environment through an orifice in the inlet valve 2, through the channel 14 of the body housing 1, through the outlet 4, through a coupling adapter 12 and into sampling pipe 13 leading back to a particle detector. In one or more embodiments, an aspirator in a particle detector creates suction through its sampling pipe network to allow air samples to be drawn through the benchmark test point assembly 19 when inlet valve 2 is opened. Releasing the actuator sleeve 3 causes the inlet valve 2 to automatically return to its closed position by means of compression device 8.

Using an RFID capable read/write device, such as an NFC capable mobile phone running a compatible application, technicians can read and append data stored on an RFID chip associated with a benchmark test point. Similar to passive RFID, NFC is a technology that allows devices to exchange data wirelessly over short distances using electromagnetic radio fields. NFC works by transmitting information between a plurality of devices that have NFC chips either by physically touching or being within a few centimeters of each other. NFC chips include a unique ID (UID) or serial number. In one or more embodiments, the NFC smart chip also includes on-board read/write memory where an identifier in the form of text is written to define if the chip is a benchmark test point or a sample point, type of sample point, and orifice size. In some embodiments, only authorized users having edit permissions can edit the chip data stored in the database and data written to memory can be permanently locked or password protected in which case the data is read only. If password protected, data cannot be changed unless first unprotected using a valid password. In one or more embodiments, a custom application can be used on a computing device to read data from the chip removably connected to the benchmark test point. The custom application allows the user to assign the test point to a physical location and a specific particle detector, record performance characteristics associated with the benchmark test point, and perform subsequent inspections to monitor the status of the particle detector. In one or more embodiments, data can be stored in the cloud and retrieved by a custom application on a computing device by either physically reading the chip to pull up the data or selecting the chip data if already stored in the custom application.

What is claimed is:

1. A benchmark test point apparatus for use in conjunction with a particle detector, comprising:

a body housing;

an inlet valve that removably connects to the body housing, wherein the inlet valve includes a plurality of O-rings, wherein said plurality of O-rings are constructed from one or more sealing materials, and said inlet valve has an orifice at one end that has an opening with one or more orifices centered between the O-rings;

a compression device configured to hold the inlet valve in a closed position;

an actuator sleeve, removably connected to the inlet valve, wherein the actuator sleeve is a mechanism to allow a user to control an open or closed position of the inlet valve;

an outlet that includes an interchangeable insert that can be removably fixed into an insert to a channel in the body housing;

an RFID chip and antenna that is removably connected to a part of the body housing;

wherein the RFID chip includes memory configured to store commissioning benchmark transport-time data for the benchmark test point apparatus, and to store or append subsequent inspection or test data associated with the benchmark test point apparatus over time; and an attachment method on the body housing for fastening the benchmark test point apparatus to a sampling pipe of a particle detector.

2. The apparatus of claim 1, wherein the inlet valve serves as a passageway for air to enter and flow through the body housing when the inlet valve is in the open position, and the inlet valve restricts air from passing through the orifices of the inlet valve and into the body housing when the inlet valve is in the closed position.

3. The apparatus of claim 1, wherein the materials used to construct the compression device can withstand pressure to at least 160 psi without leaking or fracturing and the compression device holding the inlet valve in a closed position is sized such that it provides sufficient compression to keep the inlet valve closed to at least 160 psi.

4. The apparatus of claim 1, wherein the actuator sleeve includes a recess for mounting an NFC or other RFID chip and antenna that may be removably attached to the actuator sleeve.

5. The apparatus of claim 1, wherein the outlet has an interchangeable engineered preformed through-hole sized equivalent to what is specified in calculations used to validate performance of the particle detector and its sampling pipe network.

6. The apparatus of claim 1, wherein a vertical guide track in the body housing keeps the actuator sleeve from rotating until it reaches the valve fully open position where it can then be rotated to the locked position by way of optional locking tabs in the actuator sleeve that travel along a channel in the body housing.

7. The apparatus of claim 1, wherein the RFID chip can permanently store and append commissioning, test, and inspection data for predictive analytics with retrieval and reporting functions to alleviate users from sourcing historical or missing static documentation.

8. The apparatus of claim 1, wherein a custom application can be used on a computing device to read and append data stored on the RFID chip associated with the benchmark test point.

9. A benchmark test point system for use in conjunction with a particle detector, comprising:

a body housing;

an inlet valve that removably connects to the body housing, wherein the inlet valve includes a plurality of O-rings, wherein said plurality of O-rings are constructed from one or more sealing materials, and said inlet valve has an orifice at one end that has an opening with one or more orifices centered between the O-rings;

a compression device configured to hold the inlet valve in a closed position;

an actuator sleeve, removably connected to the inlet valve, wherein the actuator sleeve is a mechanism to allow a user to control an open or closed position of the inlet valve;

an outlet that includes an interchangeable insert that can be removably fixed into the insert to a channel in the body housing;

an RFID chip and antenna that is removably connected to a part of the body housing; and an attachment method on the body housing for fastening the benchmark test point system to a sampling pipe of a particle detector.

10. The system of claim 9, wherein the inlet valve serves as a passageway for air to enter and flow through the body housing when the inlet valve is in the open position, and the inlet valve restricts air from passing through the orifices of the inlet valve and into the body housing when the inlet valve is in the closed position.

11. The system of claim 9, wherein the materials used to construct the compression device can withstand pressure to at least 160 psi without leaking or fracturing and the compression device holding the inlet valve in a closed position is sized such that it provides sufficient compression to keep the inlet valve closed to at least 160 psi.

12. The system of claim 9, wherein the actuator sleeve includes a recess for mounting an NFC or other RFID chip that may be removably attached to the actuator sleeve.

13. The system of claim 9, wherein the outlet has an interchangeable engineered preformed through-hole sized equivalent to what is specified in calculations used to validate performance of the particle detector and its sampling pipe network.

14. The system of claim 9, wherein a vertical guide track in the body housing keeps the actuator sleeve from rotating until it reaches the valve fully open position where it can then be rotated to the locked position by way of optional locking tabs in the actuator sleeve that travel along a channel in the body housing.

15. The system of claim 9, wherein the RFID chip can permanently store and append commissioning, test, and inspection data for predictive analytics with retrieval and reporting functions to alleviate users from sourcing historical or missing documentation.

16. The system of claim 9, wherein a custom application can be used on a computing device to read and append data stored on the RFID chip associated with the benchmark test point.

17. A method for transferring particles with a benchmark test point, comprising:

collecting an air sample through an inlet valve that serves as a passageway for air to enter and flow through a body housing when the inlet valve is in the open position, and the inlet valve restricts air from passing through the orifices of the inlet valve and into the body housing when the inlet valve is in the closed position;

collecting performance data from the air sample using an RFID chip and antenna;

storing and appending performance data from the RFID chip and antenna to an on-board read/write memory where an identifier in the form of text is written to define if the chip is a benchmark test point or a sample point, type of sample point, and orifice size;

transmitting the data to a custom application used on a computing device to read chip data embedded in the benchmark test point;

assigning the chip data from the custom application to a physical location and a specific particle detector, recording performance characteristics associated with the benchmark test point, and performing subsequent inspections to monitor the status of the particle detector.

18. The method of claim 17, wherein the chip data is stored in the cloud and can be retrieved by the custom application used on a computing device.

19. The method of claim 17, wherein a user can use a computing device to retrieve the data by either physically scanning the chip to pull up the data or selecting the chip data if already stored by the custom application used on a computing device.

20. The method of claim 17, wherein only authorized users having edit permissions can edit the chip data stored in the database and data written to memory can be permanently locked or password protected in which case the data is read only.

* * * * *